Patented Dec. 15, 1931

1,836,212

UNITED STATES PATENT OFFICE

HENRY J. WEILAND AND IVAN GUBELMANN, OF SOUTH MILWAUKEE, WISCONSIN, ASSIGNORS, BY MESNE ASSIGNMENTS, TO E. I. DU PONT DE NEMOURS & COMPANY, A CORPORATION OF DELAWARE

PURIFICATION OF P-NITRO-TOLUENE

No Drawing.  Application filed March 28, 1928.  Serial No. 265,517.

This invention relates to a process of purifying organic bodies and more particularly to a process of isolating substantially pure para nitro toluene from a mixture containing isomeric nitro toluenes.

As is well known, the nitration of toluene results in the formation of a mixture of isomeric nitro toluenes comprised principally of the para and ortho isomers, and a relatively small quantity of the meta isomer. Heretofore described methods for the isolation of para nitro toluene have in general employed a combination of fractional distillation and crystallization. The latter step requires a crystallizer and some sort of equipment for removing the mother liquor or impurities from the crystals, such as a centrifuge. A considerable amount of labor and attention is required in the transfer of the crystalline magma to the centrifuge and in the operation of the centrifuge.

It is accordingly an object of this invention to provide a simpler and more economical working process for the isolation of para nitro toluene in substantially pure form from a mixture of isomeric nitro toluenes.

Other and further important objects of this invention will become apparent from the following description and appended claims.

It is generally known, that upon cooling a liquid system composed principally of two chemical isomers, each having definite melting points in the pure state, provided the isomers do not crystallize in such a manner as to form mixed crystals, there results at first a crystallization of a single isomer in pure form. The crystallization of the single isomer will continue upon cooling the system until a certain point is reached, known as the eutectic point. If cooling is continued below the eutectic point, the eutectic mixture will crystallize. Eutectic point is here used in the usually accepted sense as meaning the lowest temperature to which a mixture of two or more crystalline components may be cooled without effecting the crystallization of a mixture of the components. The mother liquor remaining liquid at the eutectic temperature is here referred to as the eutectic liquor. It therefore follows that at the eutectic point the eutectic liquor is incapable of dissolving any of the components of the system and has a definite composition. However, if the temperature of the system is raised above the eutectic point, the eutectic liquor then acts as a solvent for the component present in the system in crystal form.

In the system of isomers under consideration, if the liquid portion be drained off at the eutectic point, the liquid system is in such a state of equilibrium that the introduction of either of the pure isomers will raise the melting point; or conversely, the eutectic liquor, that is, the portion separated from the partially crystallized system at the eutectic temperature will not act as a solvent for either of the pure isomers at the eutectic temperature, since it is saturated with respect to both isomers at the eutectic point. Therefore, the specific problem to effect purification is the removal of this eutectic liquor in an efficient manner.

The complete removal of the eutectic liquor becomes difficult of accomplishment at or about the eutectic point for the reason that the eutectic liquor tends strongly to adhere to the crystals and to be retained in the crystal mass by capillary action. If, however, the temperature is raised above the eutectic point, the eutectic liquor then acts as a solvent to dissolve some of the crystals and form a liquor richer in one of the components, namely the desired component. The result is that less of the desired component is obtained in crystal form but a larger proportion of the eutectic liquor can be readily drained off of the crystals.

Instead of simply draining off the eutectic liquor by gravity and displacement thereof by eutectic liquor richer in the desired component, suction may be applied or air forced through the crystal mass to displace the eutectic liquor. Water may likewise be used in place of, or in addition to air, as the displacing medium.

It is to be noted here that the above statements refer strictly to ideal cases wherein there are only two constituents or isomers, whereas in the present instance there is always some meta nitro toluene present in the mixture of ortho and para nitro toluenes. However, for practical purposes, since the cooling curves for the meta nitro toluene-para nitro-toluene system, and the ortho nitro toluene-para nitro toluene system are so similar, the meta isomer content may be regarded as producing an effect closely similar to the effect produced by the presence of the ortho isomer.

For the purposes as set forth in this invention, it makes no practical or material difference whether the impurity present be either meta or ortho nitro toluene or a mixture of the two.

The solution of the problem of purification, as we see it, resides first in the cooling of a molten mixture of ortho, para and meta nitro toluenes to a minimum temperature under very closely regulated conditions of cooling and without agitation in order to obtain the crystals of the desired product, namely para nitro toluene, in maximum amount; secondly in the obtaining of crystals in such a physical form that the liquid impurities may be advantageously removed from the crystals; and thirdly in removing the liquid impurities in a practical manner.

These conditions are most advantageously met by placing the molten mass containing the desired product and impurities to be removed in a tank equipped with coils set at close intervals to one another through-out its height. A cooling or heating medium as required is then circulated through these coils, the temperature of the medium being controlled by a thermostat and a heating unit capable of maintaining the temperature within $\frac{1}{2}°$ C. of the desired point. In order to form crystals of good physical form it is advantageous not to agitate the mass during the step of crystallizing. The liquid impurities which gravitate to the bottom of the tank are removed by draining alone or by draining together with the application of suction.

Working under these conditions, the desired product is crystallized out with maximum efficiency and the impurities are for the most part present in a liquid state. The product which has been simply drained of the liquid impurities has been found to be sufficiently pure for many uses, but in order to obtain products of the highest purity it is necessary to displace the remaining liquid impurities, as by air pressure, or by displacement with water or eutectic liquor enriched with para nitro toluene.

It should be noted that in our improved process the actual crystals are not transferred to another piece of apparatus for the removal of the liquid impurities. The step of handling and all contact with the more or less toxic materials are thus eliminated.

Without limiting our invention to any particular procedure, the following examples will serve to illustrate our method in its preferred form:

Example I

Crude para nitro toluene with a crystallizing point of about 32° C. is charged into the crystallizer. Cooling brine is run through the coils at an initial temperature of about 28° C. This temperature is gradually dropped to 0° C. The brine is circulated through the coils until the temperature of the liquid portion has dropped to about 2° C. A valve is now opened in the bottom of the crystallizer and the liquid portion drained into a receiver. Suction is applied to remove the bulk of the liquid impurities. As soon as the flow of liquid has practically ceased, the medium in the coils is heated up slowly to about 48° C. When heat is applied to the coils more liquid impurities drain out. This draining is continued until maxmum temperature is reached. The drain valve is now closed and the crystals of para nitro toluene melted completely. The refined product has a crystallizing point of 50° C. or above.

Example II

The procedure as described in Example I is followed except that instead of reheating the crystals by means of the medium in the coils, water introduced directly upon the crystals is employed. The temperature of the water is slowly increased up to about 48° C. The finally melted product will have a crystallizing point above 50° C. on the water free basis.

It should be further noted that the entire system including the eutectic mixture may be frozen practically solid and the eutectic liquor be reformed by slowly bringing the temperature back to the eutectic point.

Obviously the ideal practice for maximum efficiency would be to draw off the liquid portion at the eutectic point. In some cases, however, this temperature is not practical of attainment on account of its being so low as to entail large refrigeration losses. Therefore it should be understood that by the term "temperature slightly above the eutectic point", as used in the claims, is meant a temperature sufficiently above the eutectic point of the system to permit an economical recovery of the para component.

We are aware that numerous details of the process may be varied through a wide range without departing from the principles of this invention, and we, therefore, do not purpose limiting the patent granted hereon otherwise than necessitated by the prior art.

We claim as our invention:

1. In the process of isolating a substantially pure para nitro toluene from a mixture containing principally para nitro toluene together with isomeric nitro toluene, the para component being in excess of its proportion in a eutectic mixture of the isomers the steps which comprise cooling the mixture from a molten condition to a temperature slightly above the eutectic point without agitation and removing by gravity and positive displacement by a fluid medium, portions of the mixture that are liquid at that temperature.

2. In the process of isolating substantially pure para nitro toluene from a mixture containing principally para nitro toluene and a relatively smaller quantity of other isomers, the steps which comprise slowly bringing said mixture without agitation to a temperature slightly above the eutectic point, removing portions of the mixture that are liquid at that temperature, gradually heating the remaining mass to a temperature below the crystallizing point of pure para nitro toluene and continuously removing those portions of the mass that are liquid during the heating up stage.

3. The process of isolating substantially pure para nitro toluene from a crude mixture containing principally the para isomer and a relatively small proportion of other isomers, which comprises slowly cooling said mixture from a molten condition without agitation to a temperature slightly above the eutectic point, thereby forming exclusively crystals of the para isomer, largely removing the liquid impurities from said crystals by gravity, slowly heating the remaining crystal mass to a temperature below the crystallizing point of pure para nitro toluene, thereby dissolving some of the pure para isomer crystals in the adhering liquid and displacing the enriched liquid portion by a fluid medium to obtain substantially pure para nitro toluene.

4. The process of obtaining substantially pure para nitro toluene from a crude para nitro toluene mass containing isomeric nitro toluene, which comprises slowly cooling the mass from a molten condition without agitation to a temperature of about 2° C., removing by gravity those portions of the mass that are liquid at that temperature, slowly heating the remaining mass to a temperature of about 48° C. and continuously removing by gravity those portions of the mass that are liquid during the heating stage.

5. The process of obtaining substantially pure para nitro toluene from a crude para nitro toluene mass containing an isomeric nitro toluene, which comprises gradually cooling the mass under regulated conditions, without agitation, from a molten condition to a temperature of about 2° C., removing those portions of the mass that are liquid at that temperature by draining and the application of suction to the mass, slowly heating the remaining mass to about 48° C. and simultaneously applying suction to the mass to remove liquid portions therefrom.

6. The process of obtaining substantially pure para nitro toluene from a mixture comprising mainly para nitro toluene and isomeric nitro toluene and impurities, the para component being present in higher than eutectic proportion, which comprises bringing the mixture to a temperature slightly above the eutectic point of the mixture, whereby the para component is present in solid form in equilibrium with a liquid phase, largely separating the liquid phase from the solid phase by gravity and recovering said solid para component substantially free from adhering liquid containing impurities, the entire process being carried out in the absence of mechanical agitation.

7. The process of obtaining substantially pure para-nitro-toluene from a mixture consisting of para-nitro-toluene, isomeric nitro-toluenes and impurities, the para-component being present in higher than eutectic proportions, which comprises bringing the entire system to equilibrium at a temperature at which the greater part of the para-component is present in the solid phase while the other isomers and all of the impurities are present in the liquid phase, largely separating the liquid phase from the solid phase by gravity and recovering said solid para-component substantially free from adhering liquid containing impurities, the entire process being carried out in the absence of mechanical agitation.

In testimony whereof we have hereunto subscribed our names at Carrollville, Milwaukee County, Wisconsin.

HENRY J. WEILAND.
IVAN GUBELMANN.